US006805632B2

(12) United States Patent
Suda

(10) Patent No.: US 6,805,632 B2
(45) Date of Patent: Oct. 19, 2004

(54) VIDEO SLOT GAMING MACHINE

(75) Inventor: Satoshi Suda, Atsugi (JP)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

(21) Appl. No.: 10/646,312

(22) Filed: Aug. 22, 2003

(65) Prior Publication Data

US 2004/0038730 A1 Feb. 26, 2004

Related U.S. Application Data

(62) Division of application No. 09/966,011, filed on Sep. 28, 2001, now abandoned.

(51) Int. Cl.[7] .................................................. A63F 13/00
(52) U.S. Cl. ............................................ 463/25; 463/16
(58) Field of Search ................................ 463/1, 16–22, 463/25; 273/148 R, 138.1, 138, 139; 462/25

(56) References Cited

U.S. PATENT DOCUMENTS 5,971,855 A 10/1999 Ng
5,980,384 A 11/1999 Barrie
6,050,895 A 4/2000 Luciano, Jr. et al.
6,089,976 A 7/2000 Schneider et al.
6,089,977 A 7/2000 Bennett
6,162,120 A 12/2000 Takahashi et al.
6,162,123 A 12/2000 Woolston
6,251,013 B1 6/2001 Bennett
6,261,178 B1 7/2001 Bennett
6,270,402 B1 8/2001 Fujioka et al.
6,309,299 B1 10/2001 Weiss
6,488,586 B1 12/2002 Kobayashi et al.
2001/0016513 A1 8/2001 Muir et al.

*Primary Examiner*—John M. Hotaling, II
*Assistant Examiner*—Aaron L. Enatsky
(74) *Attorney, Agent, or Firm*—Howard & Howard

(57) ABSTRACT

A video slot machine is provided. The video slot machine includes a display device for displaying a plurality of game elements in a grid having a plurality of cells defined by rows and columns, a memory device for storing a pay-table, and a game controller coupled to the display device and the memory device. The game controller is adapted to randomly select the game elements to be displayed in the display device and to determine an outcome based on the displayed game elements, a pay-table, and predetermined paylines. The selected game elements are selected from a set of possible game elements. The set of possible game elements includes a bonus element. The game controller is adapted to identify the presence of the bonus element in one of the cells of a column and to modify all of the symbols within the column to wild if a wild character in any one cells of the column would modify the outcome. A bonus game is also provided which depicts a contest between the player and the game machine.

5 Claims, 9 Drawing Sheets

VIDEO SLOT GAMING MACHINE

CROSS-REFERENCE TO RELATED APPLICATION

This application is a division of prior application Ser. No. 09/966,011 filed Sep. 28, 2001, now abandoned.

BACKGROUND OF THE INVENTION

1. Field of the Invention

The present invention relates generally to video gaming machines and more particularly, to an apparatus and method for playing a video gaming machine having bonus games and a readable recording medium recording a control program for playing the video gaming machine having bonus games.

2. Description of the Prior Art

Gaming machines, such as slot machines, are a cornerstone of the gaming industry. Generally, the popularity of such machines with players is dependent on the perceived likelihood of winning money at the particular game and the intrinsic entertainment value of the game relative to other available gaming options. Where the available gaming options include a number of competing games and the expectation of winning each game is believed to be generally the same, players are most likely to be attracted to the most entertaining and exciting games. Thus, gaming operators strive to employ the most entertaining and exciting games available because such games attract frequent play and, hence, increase profitability to the operator. Traditionally, a video gaming machine such as a slot machine includes a plurality of symbols including a wild symbol and a processor for randomly aligning the plurality of symbols on a display upon initiation of the game by a player. Generally, where the plurality of symbols are aligned so as to match a winning combination of symbols stored in a pay-out table, the player receives a pay-out based on the wager placed by the player.

Such video gaming machine concepts are found, for instance, in U.S. Pat. No. 6,251,013 issued Jun. 26, 2001 in the name of Bennett. The '013 patent discloses a video slot machine game in which a sprite randomly designates one or more of the symbols displayed on the display to be treated as special symbols.

Furthermore, one concept that has been successfully employed to enhance the entertainment value of the game is the addition of a bonus game that may be played in conjunction with the "primary" game. The bonus game may comprise any type of game, either similar to or completely different from the primary game. The bonus game is initiated upon the occurrence of a selected event or outcome of the primary game.

Because the excitement and entertainment value of the primary game provides increased player appeal relative to other gaming machines and the bonus game concept increases player appeal and excitement, thereby increasing the chance to win the potential pay-out amount, there is a continuing need to develop new features for primary and bonus games. New features are necessary to appeal to player interest and enhance excitement in order to entice longer play and satisfy demands of operators for interesting games and increased profitability. The present invention is directed to satisfying these needs.

SUMMARY OF THE INVENTION

In one aspect of the present invention, a video game machine is provided. The game machine includes a housing having a display device for displaying a plurality of game elements in a grid having a plurality of cells defined by rows and columns, a memory device for storing a pay-table, and a game controller coupled to the display device and the memory device. The game controller is adapted to randomly select the game elements to be displayed in the display device and to determine an outcome based on the displayed game elements, a wager, a pay-table, and predetermined paylines. The selected game elements are selected from a set of possible game elements. The set of possible game elements includes a bonus element. The game controller is adapted to identify the presence of the bonus element in one of the cells of a column and to modify all of the symbols within the column to wild if a wild character in any one cell of the column would modify the outcome.

In another aspect of the present invention, a video game machine is provided. The game machine includes a housing having a display device for displaying a plurality of game elements in a grid having a plurality of cells defined by rows and columns, a memory device for storing a pay-table, and a game controller coupled to the display device and the memory device. The game controller is adapted to randomly select the game elements to be displayed in the display device and to determine an outcome based on the displayed game elements, a wager, a pay-table, and predetermined paylines. The selected game elements are selected from a set of possible game elements. The game controller is adapted to activate a bonus game in response to detecting a triggering event. The bonus game is depicted as a contest between the gaming machine and the player, wherein the player chooses a player item from three possible player items in the bonus game. The outcome of the bonus game is determined as a function of the chosen player item. It should be noted that the number of possible items is not limited to three.

In yet another aspect of the present invention, a method for playing a video gaming machine, is provided. The method includes the steps of randomly selecting a plurality of game elements and displaying the plurality of game elements on a display device in a grid having a plurality of cells defined by rows and columns. The selected game elements being selected from a set of possible game elements, the set of possible game elements includes a bonus element. The method further includes the steps of determining an outcome based on the displayed game elements, a wager, a pay-table, and predetermined paylines, identifying the presence of the bonus element in one of the cells of a column, and modifying all of the symbols within the column to wild if a wild character in any one cell of the column would modify the outcome.

An additional aspect of the present invention, a method for operating a video gaming machine for play by a player is provided. The method includes the steps of randomly selecting a plurality game elements from a set of possible game elements, displaying the plurality of game elements in a grid having a plurality of cells defined by rows and columns, and determining an outcome based on the displayed game elements, a wager, a pay-table, and predetermined paylines. The method further includes the steps of activating a bonus game in response to detecting a triggering event. The bonus game being depicted as a contest between the player and the game machine.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
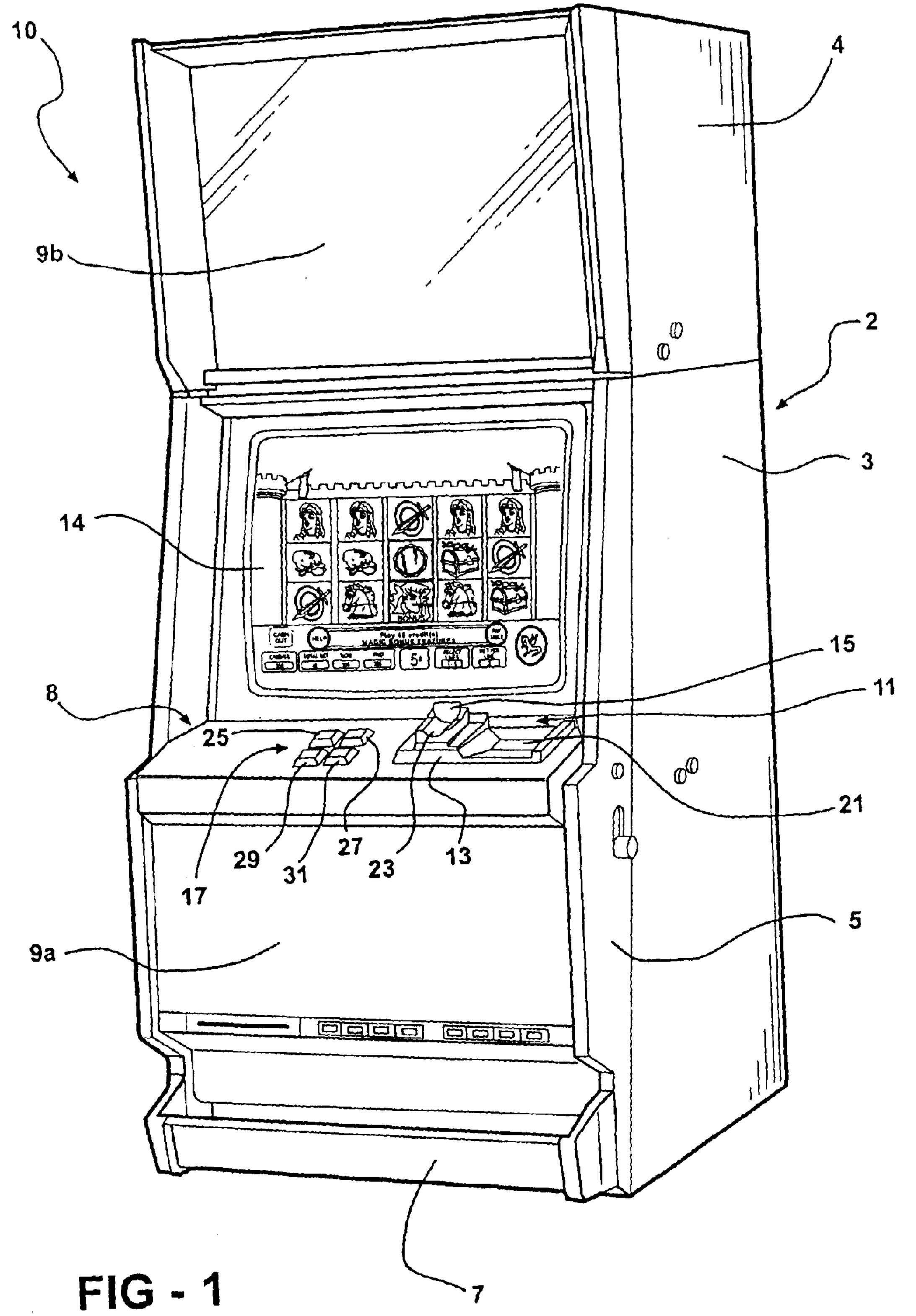
FIG. 1 is a perspective view of a gaming machine.

With reference to the drawings and in operation, the present invention provides a video slot gaming machine 10. With reference to FIG. 1, an exemplary video gaming machine 10 is illustrated into which the present invention can be incorporated to improve the enjoyment of a video game and to thereby increase the amount of time that the video game is played by patrons of a gaming establishment. FIG. 1 shows a general appearance of the video gaming machine 10 to which the present invention is applied. As shown in the FIG. 1, the machine 10 comprises a housing 2 standing upright. The housing 2 comprises a main body 3, a top box 4 mounted on a top portion of the main body 3 and a door 5 attached to a front side of the main body 3 as to be swingable between an open position and a closed position.

At a center portion of the front side of the main body 3, there is mounted a main display device or display 14 comprising a CRT, and below the display 14 is provided an operation panel 8. The operation panel 8 is attached to the door 5 so as to slope down in a forward direction of the machine 10. Below the operation panel 8 and on a front side of the top box 4, there are provided decoration panels 9*a* and 9*b* on which pictures, letters and the like representing a title of the machine 10 or the like are illustrated.

As shown in FIG. 1, the operation panel 8 is provided, from a right end toward a left end thereof, with an insertion portion 11, and an input portion 17. The insertion portion 11 is provided with a slot base 13 integrally formed with a coin insertion portion 15 and a bill insertion portion 21.

The input portion 17 is provided with four push button switches 25, 27, 29, 31 as first input devices, each of which is capable of being depressed. These push button switches 25, 27, 29, 31 are selected as switches to be operated with particular high frequency during the game, so that these switches are provided on the operation panel 8. For example, the push button switch 29 at a lower left position of the four switches is operated for starting the game. The number of the push buttons provided at the input portion 17 and functions assigned to the push buttons can be properly changed.

Figure 2:
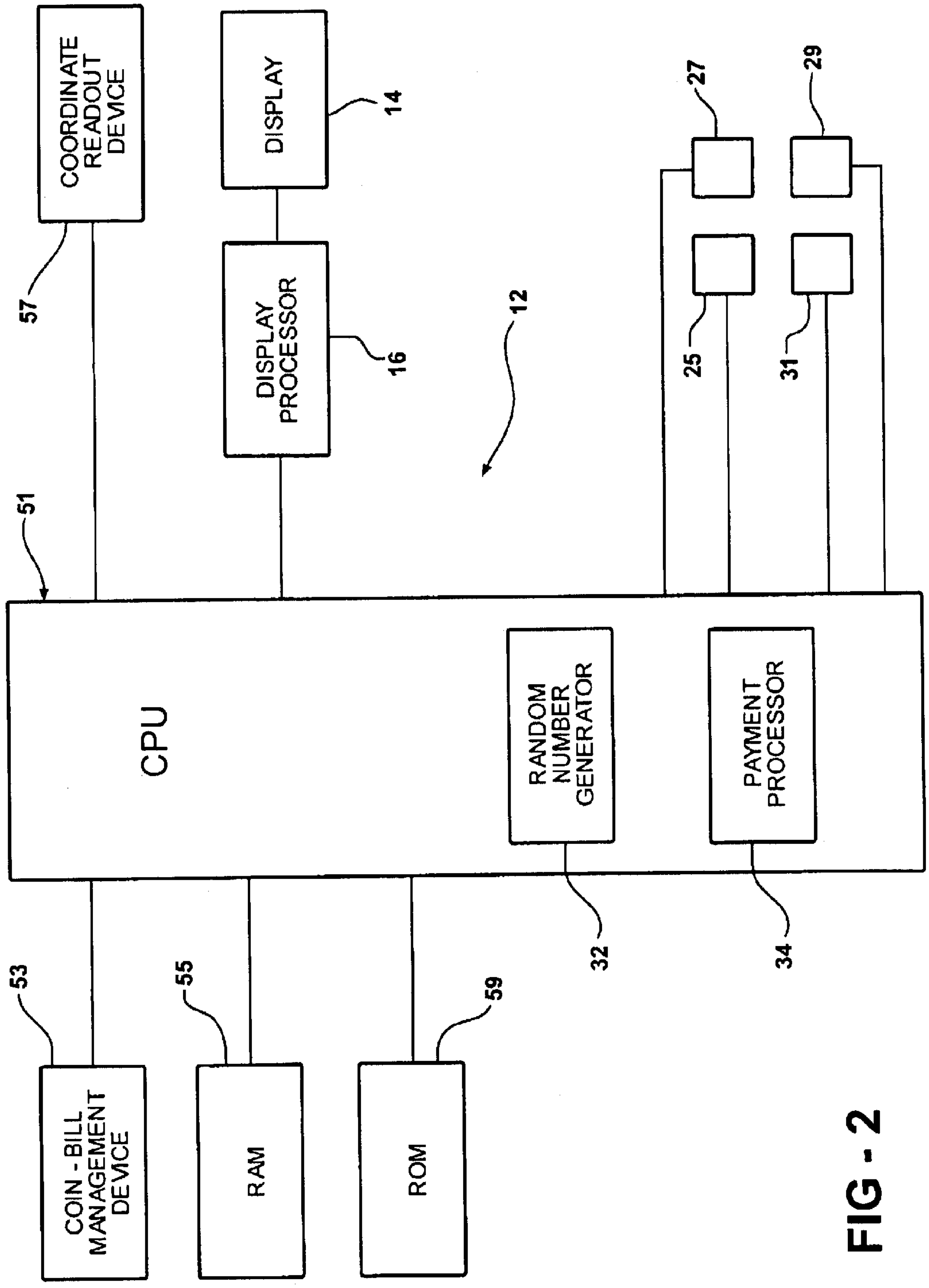
FIG. 2 is a schematic representation of the video gaming machine of the present invention.

Referring now to FIG. 2, a block diagram illustrating a schematic configuration of a control system provided in the machine 10 is depicted. The machine 10 includes a game controller 12. The game controller 12 includes a central processing unit (CPU) 51, a coin-bill management device 53, a display processor 16, RAM 55 as a memory device and EPROM 59. The CPU 51 is mainly composed of a microprocessor unit and performs various calculations and motion control necessary for the progress of the game.

The coin-bill management device 53 detects the insertion of a coin and a bill from the coin insertion portion 15 and the bill insertion portion 21, and performs a necessary process for managing coins and bills. The display processor 16 interprets commands issued from the CPU 51 and displays desirable images on the display 14. The RAM 55 temporary stores programs and data necessary for the progress of the game, and the EPROM 59 stores, in advance, programs and data for controlling basic operation of the machine 10, such as the booting operation thereof.

The video gaming machine 10 of FIG. 1 further includes the display 14 that displays a video slot machine, or other game of chance, and a player using the video gaming machine 10 interacts with the game.

The CPU 51 is electrically connected with a coordinate readout device 57 as well as the above mentioned push button switches 25, 27, 29, 31. The coordinate readout device 57 works as a second input device and comprises, for example, a so-called touch panel formed as a transparent panel on the display 14 and capable of issuing signals corresponding to the coordinates of a position touched on the display 14 by the player. The coordinate readout device 57 is closely put on the surface of the display 14 and integrated therewith. In the CPU 51, there are provided a payment processor 34 for counting value of money consumed in each game. A random number generator 32 is included for randomly generating the hand to be displayed in the game as described below.

Figure 3:
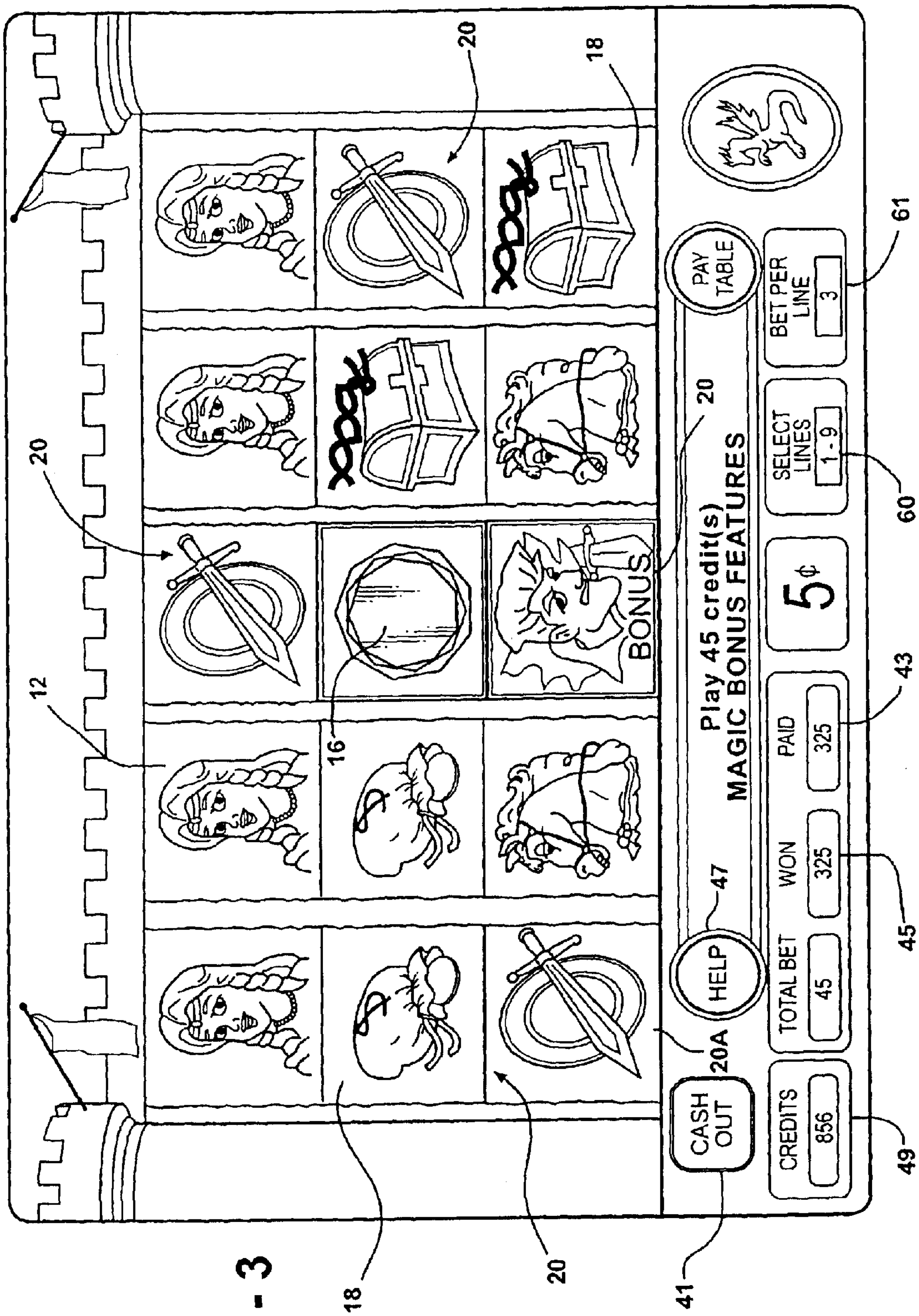
FIG. 3 is a display of a plurality of elements including a bonus element in a first display during a normal random display having a winning combination appearing within the first display.

With reference to FIGS. 1 and 3, the game controller 51 sends a signal to a display processor 16 for displaying a plurality of game elements 18 on the display 14. The display includes a cash-out touchpad 41 such that when the cash-out touchpad 41 is touched any accumulated credits are paid to the player in a coin bin 7. A winner paid meter 43 keeps track of credits paid out to a player. A credit meter 45 is displayed for informing the player of the number of winning credits won on a given spin. The touchpad could also be buttons affixed to the machine.

The display 14 further includes a help touchpad 47 for accessing information about the game. A credit meter 49 displays to the player a number of credits available to the player for game play or cash-out. A select lines touchpad 60 allows the player to toggle through and select the available sets of paylines. Preferably, the video slot gaming machine 10 is a multi-line game, i.e., the paylines include vertical paylines and/or diagonal pay-lines, and/or zig-zag paylines. A bet per line touchpad 61 allows the player to toggle to increase the bet per line a credit at a time (up to the maximum bet).

Returning to FIG. 2, the payment processor 34 is connected to the game controller 12 for awarding a regular payout in response to the game elements 18 displayed on the display 14 matching a winning combination along one of the paylines selected by the player.

With reference to FIG. 3, in one aspect of the present invention, the game controller 12, the display device or display 14 is adapted to display the plurality of game elements 18 in a grid 20 having a plurality of cells defined by rows and columns. The game EPROM provides a regular game and a bonus game. In the regular game, the game EPROM is adapted to randomly select the game elements 18 to be displayed in the display device 14. The selected game elements 18 are selected from a set of possible game elements, e.g., a treasure chest, bag of money, sword and shield, horse, flower, castle, etc. It should be noted that any type of symbols or game elements may be used. The game EPROM is adapted to determine an outcome of the regular game based on the displayed game elements 18, the pay-table, a wager, and predetermined paylines.

The game EPROM is adapted to include a bonus feature. The set of possible game elements includes a bonus element 16, which in the preferred embodiment, is a gem (see FIG. 3). After a regular game (see above), the game EPROM is adapted to identify the presence of the bonus element 16 in one of the cells of a column. As shown in FIG. 3, the game elements 18 in the display do not illustrate a winning combination of elements in any payline. Under the bonus feature, if the bonus element 16 appears in a cell, the EPROM is adapted to determine if changing all of the game elements 18 in the same column as the bonus element 16 to a wild element, i.e., the wild element is equal to any of the possible game elements to complete a payline, would change the outcome of the game.

For example, as shown in FIG. 3, the top row of game elements includes from left to right: a prince, a princess, a sword and shield, a princess and a princess. The sword and shield element is in the same column as the bonus element 16. If the sword and shield element were changed to a wild element, the top horizontal payline would include four princesses and the wild element. The wild element is interpreted as being equal to a princess. Thus, a winning combination would be found on the pay-line.

If changing the symbols in the column which includes the bonus symbol 16, modifies the outcome, then all the gaming elements 18 in that column are changed to wild elements and the outcome of the game is determined.

Figure 4:
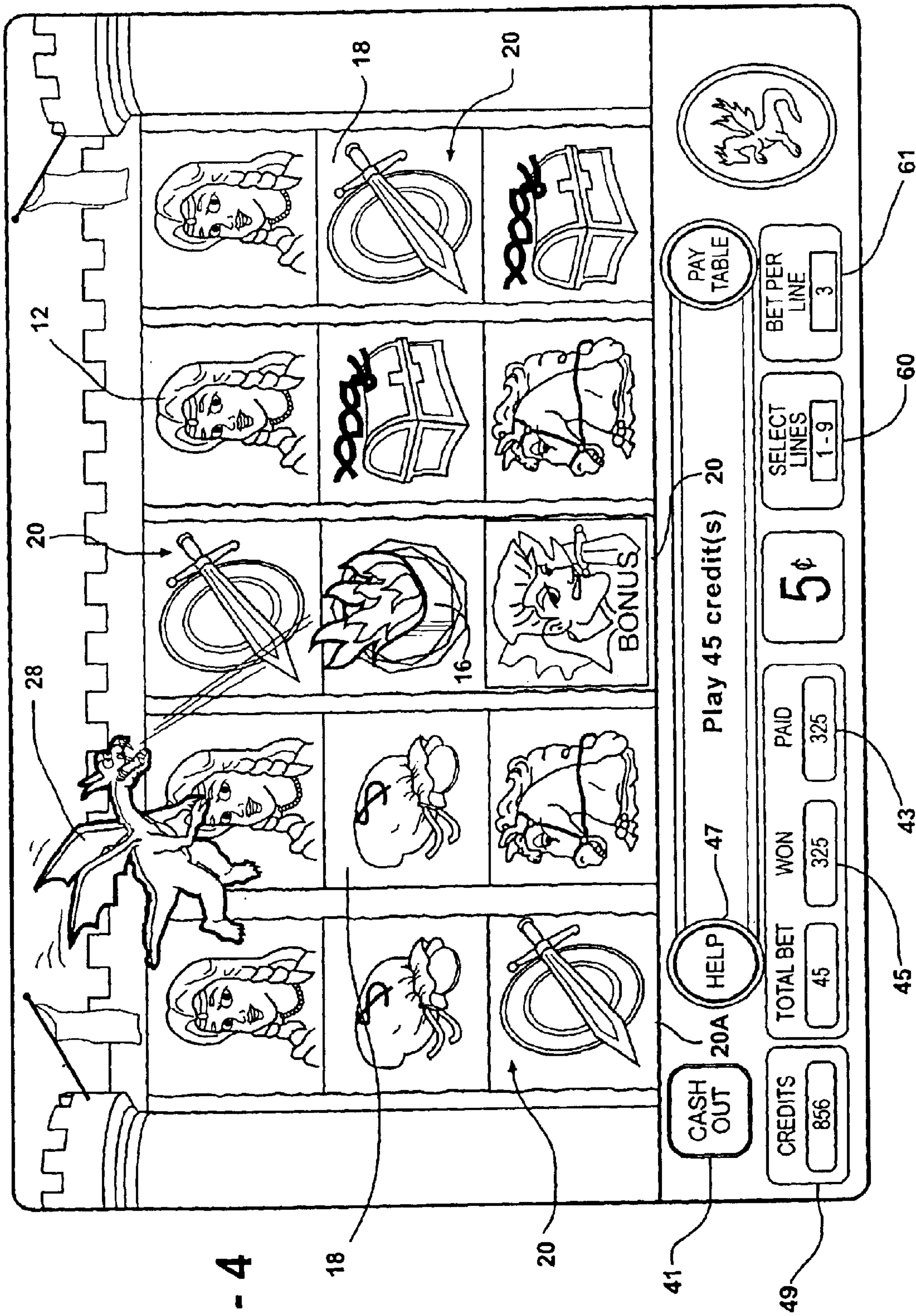
FIG. 4 is the display of FIG. 3 illustrating an animation, according to an embodiment of the present invention.
Figure 5:
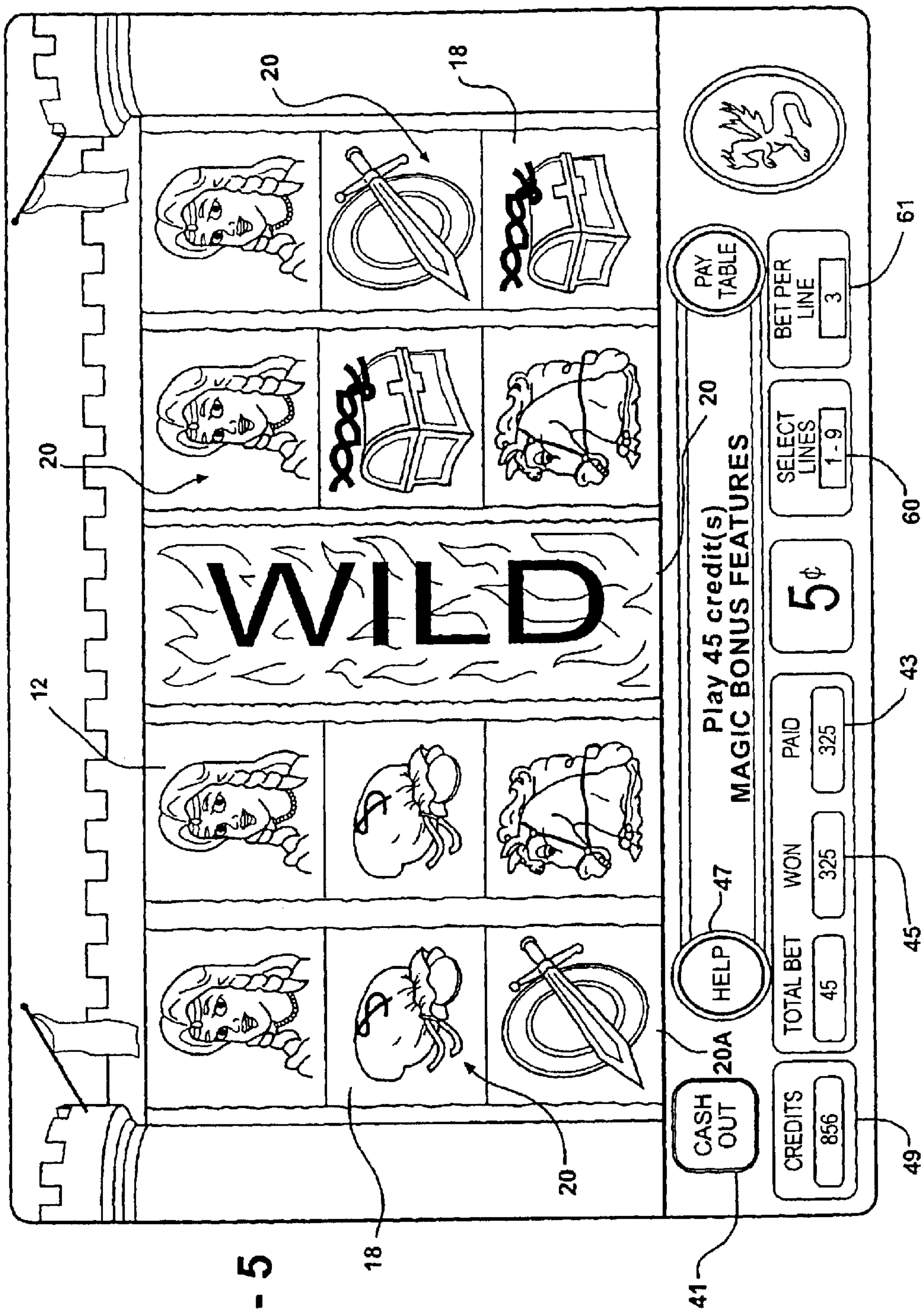
FIG. 5 is the display of FIG. 3 where the third column has been modified to wild elements.

With reference to FIGS. 4 and 5, the EPROM is adapted to display an animation of a dragon 28 flying across the display 14 and breathing fire 30 on the bonus element 16. Afterwards, the entire column is displayed as fire 32 (see FIG. 5).

Figure 6:
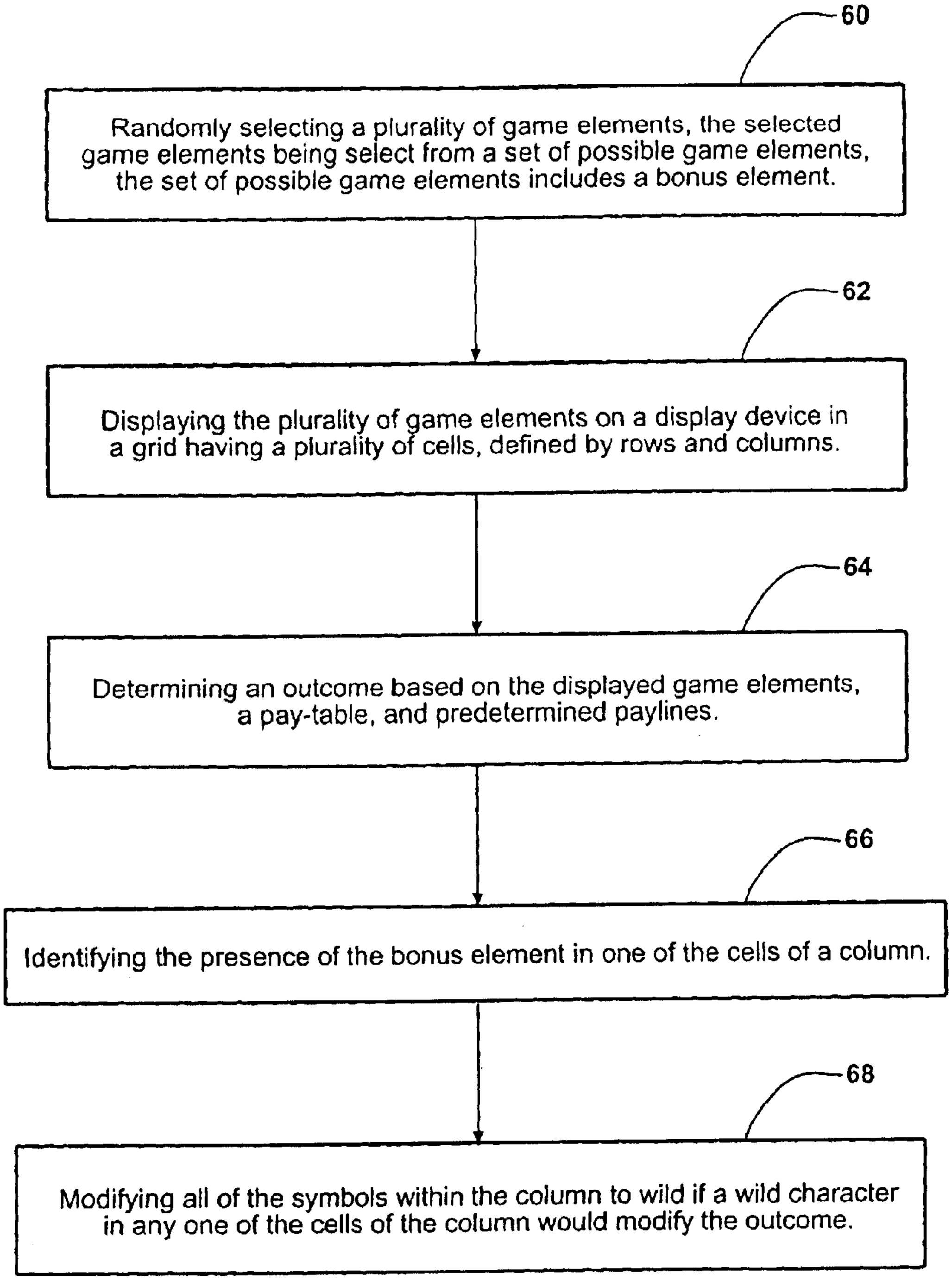
FIG. 6 is a flow diagram illustrating operation of a video gaming machine, according to an embodiment of the present invention.

With reference to FIG. 6, in one embodiment of the present invention, a method of playing a video gaming machine, according to the present invention will now be discussed. At block 60, a plurality of game elements are randomly selected from a set of possible game elements. The set of possible game elements includes a bonus element. Next, at block 62, the plurality of game elements are displayed on a display device in a grid having a plurality of cells defined by rows and columns. Next at block 64, an outcome is determined based on the displayed game elements, a pay-table, a wager, and predetermined paylines. Next at block 66, the presence of the bonus element in one of the cells of a column is identified. Next at block 68, all of the symbols within the column are modified to wild if a wild character in any one cells of the column would modify the outcome.

In another aspect of the present invention, the EPROM is adapted to activate a bonus game in response to detecting a triggering event. In the preferred embodiment, the triggering event is the appearance on the display 14 of a bonus game element 20, such as a gem, in FIG. 3.

Figure 8:
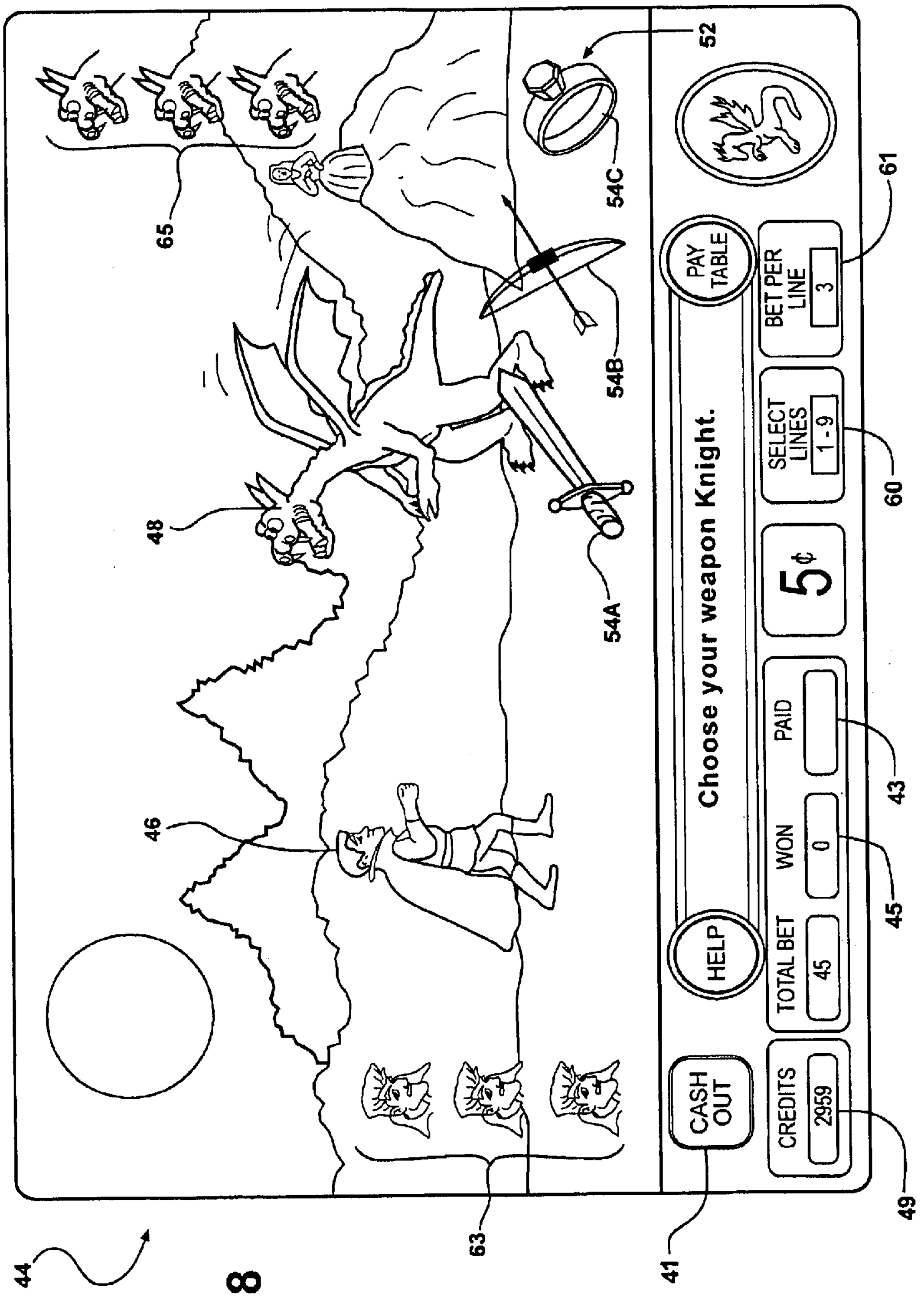
FIG. 8 is a first graphical depiction of a bonus game, according to an embodiment of the present invention; and, FIG. 9 is a second graphical depiction of the bonus game of FIG. 8.

In one embodiment, in FIG. 8, the bonus game is depicted as a contest between the gaming machine 10 and the player. The player is given the option to choose a player item 54 a-c from three possible player items 54. The number of possible player items is not limited to three.

The EPROM is adapted to randomly select a game item from three computer items in the bonus game. The outcome of a bonus game combat, i.e., whether the player wins or loses the bonus game is determined as a function of the chosen player item, the chosen game item, and a set of predetermined rules. If the player wins the bonus game combat round, the player wins a bonus or prize.

In one embodiment, the player and the gaming machine 10 are given three lives, Prince lives 63 and Dragon lives 65. The bonus game continues until either the player or the gaming machine 10 have zero lives. Each round of the bonus game, the player or the gaming machine 10 or both lose a life based on the predetermined rules. The predetermined rules are a given combination of the player item and the game item, the result is determined by computer preset rules. The set of predetermined rules includes three outcomes: player wins, player loses, and tie. The gaming machine 10 loses a life if the player wins, the player loses a life if the player loses, and the layer and the gaming machine 10 both lose a life if there is a tie.

Preferably, the player wins the bonus game, and is awarded the bonus credits, unless the player reaches zero lives before the gaming machine, i.e., if the gaming machine 10 reaches zero before or at the same time as the player.

If the player wins the bonus game, the game is adapted to determine a bonus payout and to distribute the bonus payout to the player.

Additionally, the game is adapted to display an animation of the contest between the gaming machine 10 and the player on the display device 14.

Figure 7:
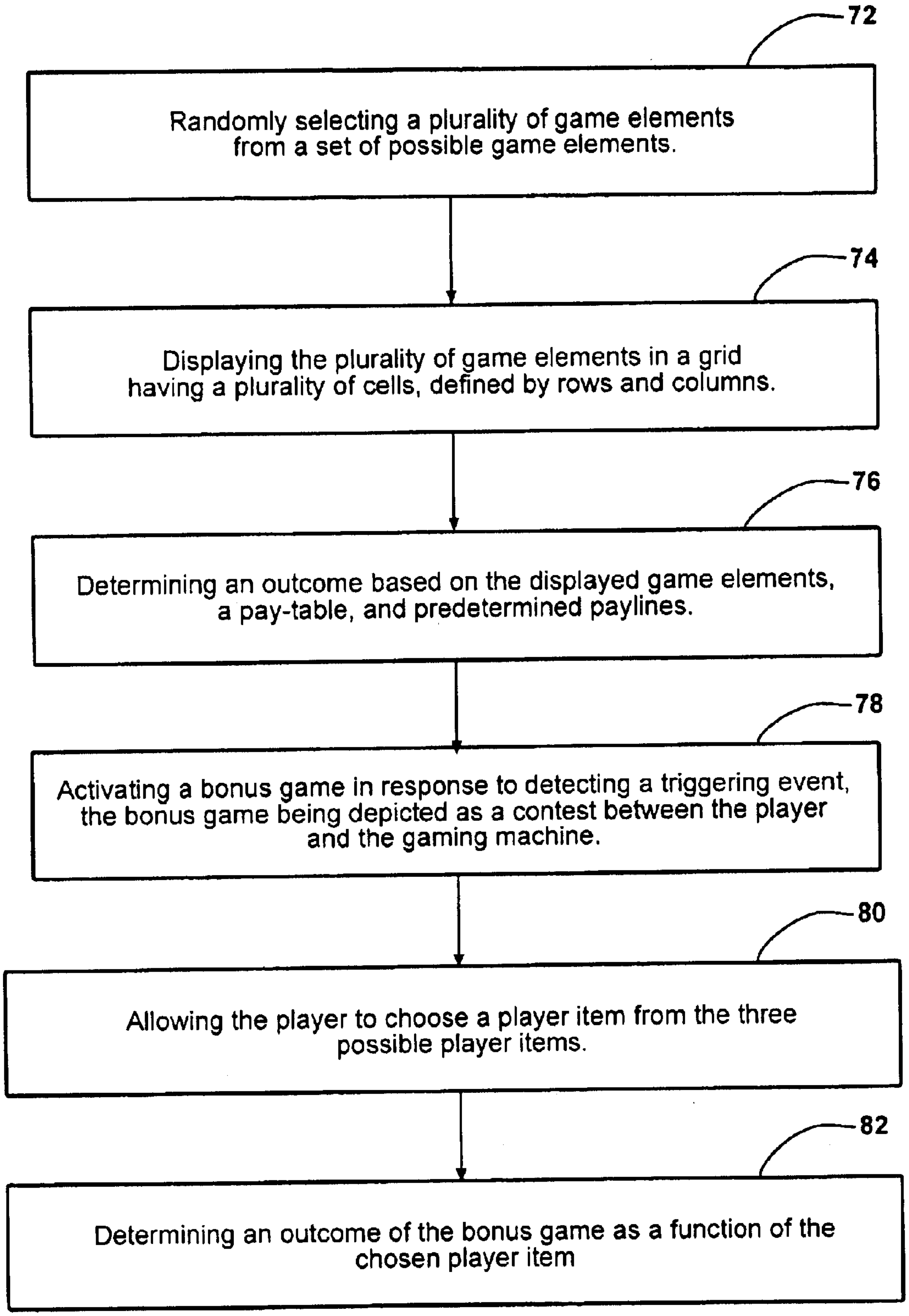
FIG. 7 is a flow diagram illustrating operation of a video gaming machine, according to another embodiment of the present invention.

With reference to FIG. 7, in another embodiment of the present invention, a method for operating a video gaming machine 10 for play by a player will now be discussed. In a first process block 72, a plurality of game elements are randomly selected from a set of possible game elements. In a second process block 74, the plurality of game elements are displayed in a grid having a plurality of cells defined by rows and columns. In a third process block 76, an outcome is determined based on the displayed game elements, a pay-table, and predetermined paylines. In a fourth process block 78, a bonus game is activated in response to detecting a triggering event. The bonus game is depicted as a contest between the player and the gaming machine 10. In a fifth process block 80, the player is allowed to choose a player Prince's weapon item from three possible player weapons. In a sixth process block 82, an outcome of the bonus game is determined as a function of the chosen player item, vis-a-vis the Dragon's combat stance.

Figure 9:
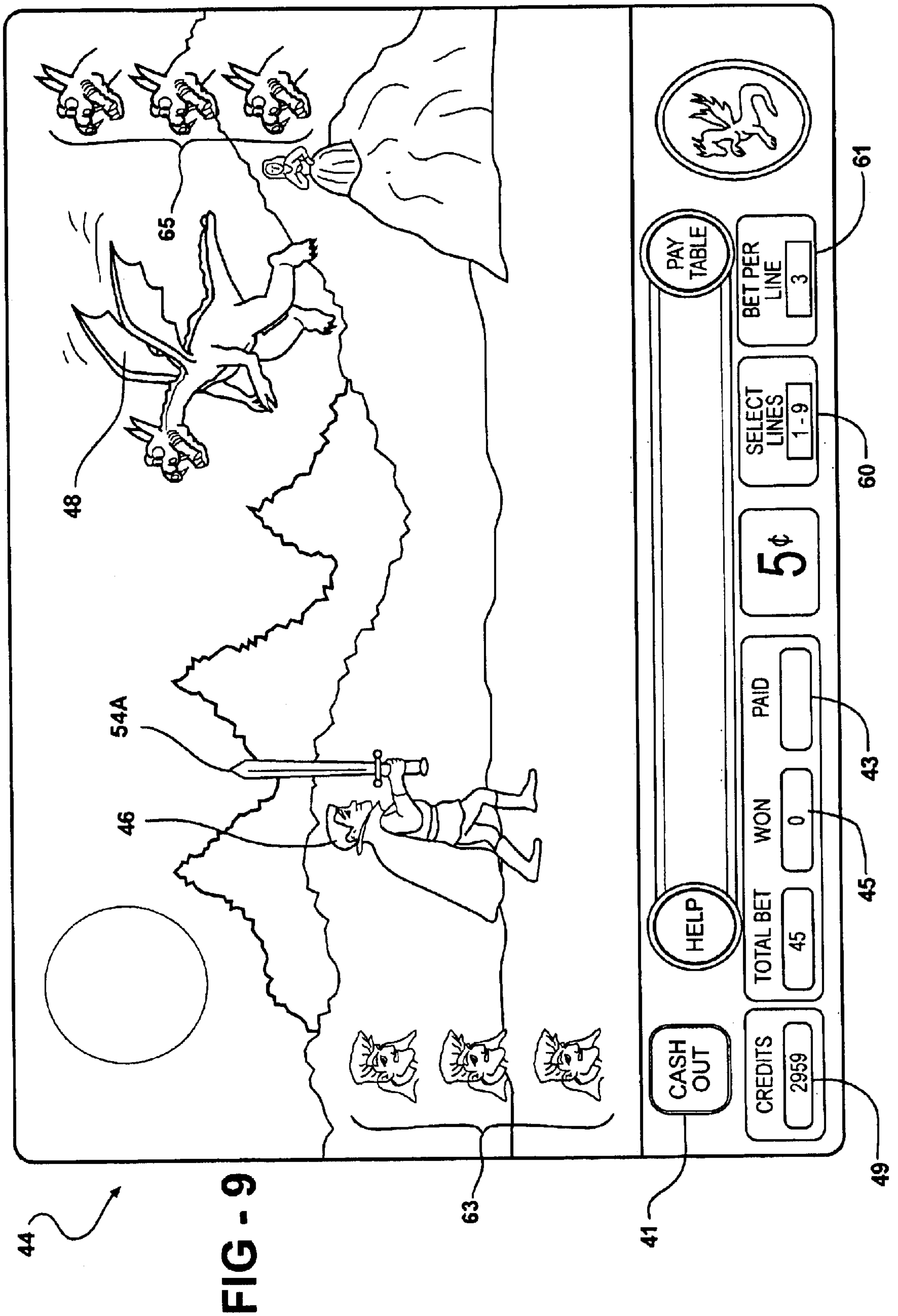

With reference to FIGS. 8 and 9, in one embodiment, the player is represented by a hero or prince 46 and the gaming machine 10 is represented by an enemy or dragon 48. The contest is a fight between the prince 46 and the dragon 48. The game controller 12 is adapted to display an animation representing the fight between the prince 46 and the dragon 48.

As shown in FIG. 8, the player is given a choice of three weapons: a sword 54A, a bow and arrow 54B, and a magic ring 54C, which may be selected by touching the corresponding video representation on the display 14. At the start of the bonus game, the prince 46 and the dragon 48 are each given three lives, as indicated by the prince icons 63 and the dragon icons 65.

The computer items from which the game controller 12 selects includes: a dragon air attack, a dragon ground attack, and a dragon magic tornado attack. The air attack is shown in FIG. 9.

For example, if the player chooses the sword 54A and the game controller 12 chooses the dragon attack, there is a tie. If the game controller 12 chose the dragon flight attack, the player loses. If the game controller 12 chose the dragon tornado attack, the player wins.

Preferably, if during the combat or bonus round the prince wins or ties a round or melee, the player gets a first bonus. Further at end of the bonus, the player gets a low bonus if the prince dies (loses all of his lives before the dragon). If the prince and dragon tie, or the prince wins, the player gets a higher bonus.

Additionally, a different animation is shown depending on the result of the bonus round. For example, if the prince wins, the prince saves the princess in the animation. If the prince loses, the dragon takes the princess away.

Other aspect and features of the present invention can be obtained from a study of the drawings, the disclosure, and the appended claims.

What is claimed is:

1. A video gaming machine, comprising:

a housing having a display device for displaying a plurality of game elements in a grid having a plurality of cells defined by rows and columns;

a memory device for storing a pay-table;

a game controller coupled to the display device and the memory device, the game controller being adapted to randomly select the game elements to be displayed in the display device, from a set of possible game elements, and to determine an outcome based on the displayed game elements, the pay-table, and predetermined paylines; and wherein the set of possible game elements includes a bonus element, and wherein the game controller is adapted to identify the presence of the bonus element in one of the cells of at least one column and to modify all of the game elements within the column to wild without modifying any of the game elements in other columns in which a bonus element is not present and only if a wild character in any one of the cells of the column would result in a winning outcome to a player of the video gaming machine.

2. A video gaming machine, comprising:

a housing having a display device for displaying a plurality of game elements in a grid having a plurality of cells defined by rows and columns;

a memory device for storing a pay-table;

a game controller coupled to the display device and the memory device, the game controller being adapted to randomly select the game elements to be displayed in the display device from a set of possible game elements and to determine an outcome based on the displayed game elements, the pay-table, and predetermined paylines;

wherein the set of possible game elements includes a bonus element, and wherein the game controller is adapted to identify the presence of the bonus element in one of the cells of at least one column and to modify all of the game elements within the column to wild without modifying any of the game elements in other columns in which a bonus element is not present and only if a wild character in any one of the cells of the column would result in a winning outcome to a player of the video gaming machine; and wherein the game controller is adapted to display an animation of an enemy breathing fire on the bonus element to change the game elements in the column to fire to symbolize the changing of the game elements to wild.

3. A video gaming machine, as set forth in claim 2, wherein the bonus element is a jewel.

4. A method for playing a video gaming machine, including the steps of:

randomly selecting a plurality of game elements, the selected game elements being selected from a set of possible game elements, the set of possible game elements includes a bonus element;

displaying the plurality of game elements on a display device in a grid having a plurality of cells defined by rows and columns;

determining an outcome based on the displayed game elements, a pay table, and predetermined paylines;

identifying the presence of the bonus element in one of the cells of a column; and modifying all of the game elements within the column to wild without modifying any of the game elements in other columns in which a bonus element is not present and only if a wild character in any one cells of the column would result in a winning outcome to a player of the video gaming machine.

5. A computer program product for playing a video gaming machine, the computer program product comprising a computer usuable storage medium having computer readable program code means embodied in the medium, the computer readable program code means comprising:

computer readable program code means for randomly selecting a plurality of game elements, the selected game elements being selected from a set of possible game elements, the set of possible game elements includes a bonus element;

computer readable program code means for displaying the plurality of game elements on a display device in a grid having a plurality of cells defined by rows and columns;

computer readable program code means for determining an outcome based on the displayed game elements, a pay-table, and predetermined paylines;

computer readable program code means for identifying the presence of the bonus element in one of the cells of a column; and, computer readable program code means for modifying all of the game elements within the column to wild without modifying any of the game elements in other columns in which a bonus element is not present and only if a wild character in any one cells of the column would result in a winning outcome to a player of the video gaming machine.

* * * * *

UNITED STATES PATENT AND TRADEMARK OFFICE

CERTIFICATE OF CORRECTION

PATENT NO. : 6,805,632 B2
APPLICATION NO. : 10/646312
DATED : October 19, 2004
INVENTOR(S) : Suda It is certified that error appears in the above-identified patent and that said Letters Patent is hereby corrected as shown below:

Column 3, line 38, after “3” insert therein --so--.

Column 8, line 50, after “and” delete [,].

Signed and Sealed this

Twenty-second Day of August, 2006

JON W. DUDAS
*Director of the United States Patent and Trademark Office*